United States Patent Office 3,470,028
Patented Sept. 30, 1969

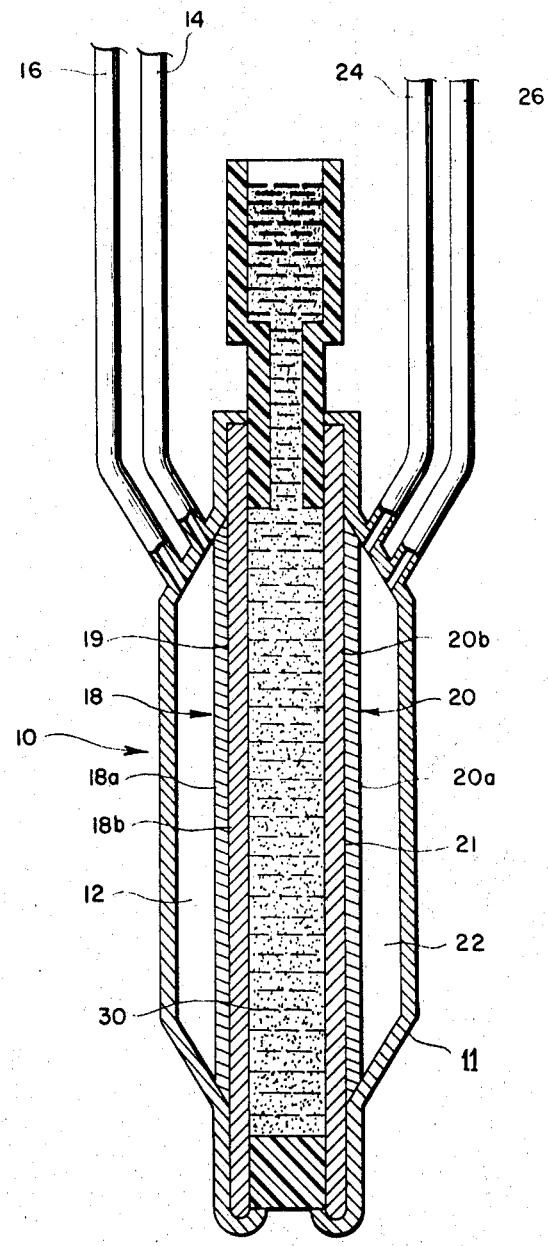

3,470,028
INTERMEDIATE TEMPERATURE PACKED FUEL CELLS
John H. Sizer, Jr., Vernon, Conn., and Jose Giner, Sudbury, Mass., assignors to United Aircraft Corporation, East Hartford, Conn., a corporation of Delaware
Filed Aug. 25, 1966, Ser. No. 575,070
Int. Cl. H01m 27/04
U.S. Cl. 136—86       12 Claims This invention relates to fuel cells. More particularly, it relates to improved intermediate temperature fuel cells which contain a particulate packing between their electrodes.

In the development of hydrogen-oxygen fuel cells, it has been found that their performance can be improved by operation at higher pressures, which increase the rate of gas transport through the electrodes, and at higher temperatures, which produce more rapid electrochemical reactions. High temperature cell operation is achieved by utilizing the waste heat liberated in the cell to maintain it at the desired high operating temperatures.

One type of fuel cell which has been developed to operate at elevated temperatures and pressures is the so-called "Bacon" cell of the type described in U.S. Patent No. 2,716,670 to Francis T. Bacon. The Bacon cell is an "intermediate temperature" cell, operating at temperatures of about 350 to 500° F.

All fuel cells are composed of five basic components—two electrodes on which the fuel-cell reactions occur, two gas supply means that supply fuel and oxidant to the respective electrodes, and an electrolyte that transfers the ions, formed by the electrode reactions, from one electrode to the other. The Bacon, or intermediate temperature, fuel cell is characterized by its normal use of hydrogen as the fuel, by the use of either oxygen or air as the oxidant, and by operation at intermediate temperature levels of 350 to 500° F. These cells, operating on hydrogen and oxygen, normally use reactant gas pressures of about 40 to 60 p.s.i.a., although gas pressures of up to 800 p.s.i.a. or higher can be used. Although any suitable electrode material can be used, both electrodes of the intermediate temperature Bacon fuel cell are normally constructed of porous nickel (Ni).

As pointed out above, the basic current generating reaction of the fuel cell occurs on the electrodes of the cell. In the intermediate temperature hydrogen-oxygen fuel cell, oxygen and water at the cathode of the cell accept electrons and form negatively charged hydroxyl ions. These ions migrate in the electrolyte to the anode where they react with hydrogen to form water and electrons. These electrons then travel through an external load circuit to the cathode, thereby producing the desired current flow.

The overall fuel cell reaction can be summarized as:

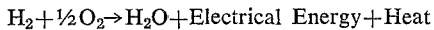

$$H_2 + \tfrac{1}{2}O_2 \rightarrow H_2O + \text{Electrical Energy} + \text{Heat}$$

Excess water not used in the cathode reaction is removed from the cell along with either the excess oxygen or hydrogen being purged from the cathode and anode, respectively.

Operation of the Bacon or intermediate temperature cell at temperatures in the 350 to 500° F. range is dictated by the physical and chemical characteristics of the cell electrodes. Limitations in the ability of the cell electrode structure to act as a catalyst for cell reactions require that temperatures of at least about 350° F. be used. On the other hand, corrosion properties of the electrodes require that operation for sustained periods take place at temperatures not greater than about 500° F.

The use of intermediate temperature cells has produced several important advantages over previously used compact and low-temperature cells. For example, intermediate temperature cells produce high open-circuit votlage, achieve high performance levels using hydrogen and oxygen, and allow the use of relatively inexpensive nickel electrodes with no need for expensive reaction catalysts.

To fully realize these advantages, however, it has proved necessary to overcome certain problems inherent in the intermediate temperature cells. One of the more acute of these problems results from the relatively high electrochemical corrosion of nickel at the cathode of the fuel cell. In the conventional Bacon or intermediate temperature fuel cell the electrodes are preferably biporous in structure. The large pores of the electrode face the gas supply and the small pores face the electrolyte. The three-phase interface of gas, electrode, and electrolyte occurs substantially at the juncture of the two sections of the biporous electrode, i.e., the wall where the large pore section meets the fine pore section. Such biporous electrodes and the means for their construction are more fully described in U.S. Patent No. 2,716,670 to Bacon.

These biporous electrodes serve the purpose of controlling the location of the reaction interface without the need for rigid reactant gas pressure control. However, the fine pore nickel, or other metal layer, which is in continuous contact with corrosive electrolyte during operation of the cell, undergoes severe deterioration due to the relatively high electrochemical corrosion rate of nickel and other metals which are used to construct the electrode. This corrosion or dissolution results primarily from the formation of a soluble nickel oxide called "nickelate" at the oxygen electrode during operation of the cell.

Dissolution of the nickel electrode into solution in the electrolyte not only produces a necessary destruction of the eletcrode, but after a sufficient period of operation the nickel migrates in substantial amounts to the anode (the fuel or hydrogen electrode) and plates out as metallic nickel on that electrode. This nickel builds up preferentially into dendrites on rough spots or imperfections on the anode. If the reaction proceeds long enough, these dendrites can bridge the gap between the cathode and the anode and short-circuit the entire cell. The migration of the nickel ion through the electrolyte to the vicinity of the anode reduces the concentration of Ni near the cathode which in turn increases the rate of further dissolution of the metal from the cathode.

Accordingly, it is a primary object of this invention to provide a new and improved intermediate temperature fuel cell which inhibits and retards nickel dendrite growth from anode to cathode and thereby increases the useful life of the cell.

Another object of this invention is to provide a new and improved intermediate temperature fuel cell operating at temperatures of about 350 to 500° F. which has conventional biporous nickel electrodes, and uses a conventional alkali metal hydroxide electrolyte, but which contains means to prevent migration of dissolved nickel from the cathode to the anode during operation of the cell.

A further object of this invention is to provide an intermediate temperature fuel cell which exhibits reduced dissolution of the cathode during operation.

A still further object of this invention is to provide an intermediate temperature fuel cell which achieves reduced cathode dissolution by maintaining a saturated solution of metal from the cathode in the area adjacent to that electrode, thereby inhibiting further dissolution of that electrode.

Still another object of the present invention is to provide an intermediate temperature fuel cell having a novel packing between its electrodes which reduces the mobility of the metal dissolved from the electrode in the operation of the cell and thereby inhibits movement to the anode of the metal ion dissolved at the cathode of the cell.

A still further object of this invention is to provide an intermediate temperature fuel cell which, in operation, produces a concentrated solution of the metal of the cathode in the vicinity of the cathode, thereby retarding further dissolution of that electrode.

Yet another object of this invention is to provide an intermediate temperature fuel cell having a novel particulate packing between its electrodes, which packing retains its particulate character during intermediate temperature operation of the cell.

Yet a further object of this invention is to provide an intermediate temperature fuel cell having a packing between its electrodes which is stable in concentrated alkali metal electrolytes at intermediate temperature operation.

Additional objects and advantages of the invention will be set forth in part in the description which follows and in part will be obvious from the description or may be learned by practice of the invention, the objects and advantages being realized and attained by means of the instrumentalities and combinations particularly pointed out in the appended claims.

To overcome the problems caused by the dissolution of the cathode during the operation of intermediate temperature hydrogen-oxygen fuel cells, and to achieve the foregoing objects and advantages, and in accordance with its purpose the present invention provides an intermediate temperature fuel cell having a particulate packing between the cell electrodes to prevent migration of dissolved nickel, or other electrode metals, from the vicinity of the cathode to the anode, and to thereby prevent dendrite formation at the anode of the fuel cell. This particulate packing comprises ceria ($CeO_2$) or thoria ($ThO_2$).

As embodied and broadly described, the fuel cell of this invention comprises a housing, a fuel electrode, an oxidant electrode, means for supplying fuel and oxidant to these respective electrodes, a particulate ceria or thoria packing between the electrodes, and an electrolyte dispersed in the packing between the electrodes. This fuel cell is designed to operate at temperatures of about 350 to 500° F. by the reaction of hydrogen and oxygen. Advantageously, both of the electrodes of the cell are made of nickel, and they are preferably biporous nickel electrodes. The electrolyte used in the cell, which establishes conducting paths between the electrodes, is advantageously an alkali metal hydroxide and preferably is either a concentrated aqueous solution of alkali metal hydroxide or a molten alkali metal hydroxide.

While the electrodes are advantageously the biporous electrodes conventionally used in Bacon or intermediate temperature cells, it will be understood that this invention, in its broadest form, also contemplates the use of single porosity electrodes. With such electrodes the packing particles, rather than a fine pore electrode layer, serve to control the three-phase interface between fuel, oxidant and electrolyte.

The invention consists in the novel parts, constructions, arrangements, combinations, and improvements shown and described.

The accompanying drawing, which is incorporated in and constitutes a part of this specification, illustrates one embodiment of the invention and, together with the description herein, serves to explain the principles of the invention.

The drawing is a sectional view of an intermediate temperature packed fuel cell constructed in accordance with this invention.

It is to be understood that both the foregoing general description and the following detailed description are exemplary and explanatory but are not restrictive of the invention. Reference will now be made in detail to the present preferred embodiment of the invention, an example of which is illustrated in the accompanying drawing.

As shown in the drawing, the fuel cell of this invention, indicated generally at 10, comprises spaced electrodes 18 and 20, and the space 30 between them is packed substantially full with particulate ceria or thoria. The space 30 between electrodes 18 and 20 also contains an electrolyte that establishes conducting paths between the electrodes of the cell.

In accordance with the invention, a fuel cell designed to operate at intermediate temperatures of about 350 to 500° F. is provided. As embodied, this fuel cell is a Bacon-type cell which operates by reaction of hydrogen and oxygen at these temperature levels. The fuel-cell housing indicated generally at 11 completely surrounds the cell and renders it gas tight.

In accordance with the invention, an oxidant electrode and a fuel electrode are contained in the cell. As embodied, both of these electrodes are constructed of porous metals, preferably nickel, in the manner set forth in Patent No. 2,716,670 to Bacon. As embodied, oxidant electrode 18 comprises a biporous nickel electrode having a large-pore section 18a and a fine-pore section 18b which are joined together at oxidant-electrode interface 19. Large-pore section 18a of oxidant electrode 18 faces the oxidizing gas supplied to the cell through oxidant inlet 14, and fine-pore section 18b of oxidant electrode 18 faces the electrolyte and packing material present in space 30. Space 30 separates oxidant electrode 18 from fuel electrode 20.

In accordance with the invention, the fuel cell is also provided with a fuel electrode. This fuel electrode is also constructed of a porous metal, preferably nickel, As embodied, biporous nickel fuel electrode 20 comprises a large-pore section 20a and a fine-pore section 20b, which are joined at fuel-electrode interface 21. Similary to the oxidant electrode, large-pore section 20a of the fuel electrode 20 faces the fuel gas brought into the cell through fuel inlet 24 while fine-pore section 20b of fuel electrode 20 faces the electrolyte and the packing material in space 30.

In accordance with the invention, means are provided for supplying oxidant to the oxidant electrode. As embodied, this means comprises an oxidant chamber 12 which includes oxidant inlet 14 and oxidant outlet 16. Oxidant chamber 12 is located immediately adjacent large-pore section 18a of oxidant electrode 18, to facilitate the supply of oxidant gas from chamber 12 to the electrode.

In accordance with the invention, means are also provided for supplying fuel to the fuel electrode. As embodied, this means comprises a fuel chamber 22, which includes fuel inlet 24 and fuel outlet 26. Fuel chamber 22 is immediately adjacent large-pore section 20a of fuel electrode 20 to facilitate the supply of fuel gas from chamber 22 to the electrode for reaction.

In accordance with the invention, the space 30 between fuel electrode 20 and oxidant electrode 18 contains an electrolyte which establishes a conducting path between the electrodes. This space 30 also contains the ceria or thoria packing of this invention. Spacing between the electrodes is necessary to allow for flexing of the electrodes and for some dendritic growth on the fuel electrode back toward the oxidant electrode.

As described above, the electrolyte which is dispersed in the packing in space 30 transfers ions formed by the electrode reactions from one electrode to the other, and thereby establishes conducting paths between the electrodes.

Concentrated solutions of potassium hydroxide (KOH) are greatly preferred as electrolytes in the fuel cells of this invention. Any alkali metal hydroxide can, however, be substituted for potassium hydroxide as the electrolyte. Thus, sodium hydroxide (NaOH), rubidium hydroxide (RbOH), cesium hydroxide (CsOH), and lithium hydroxide (LiOH) can also be used.

The concentration of the particular electrolyte selected should be at least 60 percent (i.e., the electrolyte solution should be at least 60 percent alkali metal hydroxide, and not greater than 40 percent water). There is no maximum limit for the concentration of the alkali metal hydroxide, and molten alkali metal hydroxides (such as molten KOH) can be used. Preferably, the electrolyte is a 70 to 85 percent aqueous solution of alkali metal hydroxide.

This invention provides a particular ceria or thoria packing in the space between the fuel and oxidant electrodes of the fuel cell. It is this particulate packing which inhibits dissolution of the cathode in intermediate temperature operation of the fuel cell and retards migration of dissolved cathode metal to the anode, thereby yielding the improved fuel cell performance achieved by this invention.

These results are achieved in several ways by the ceria or thoria packing of this invention. The presence of the particulate packing reduces the mobility of the nickel or other metal of the cathode within the fuel cell on its dissolution in the electrolyte. The primary action of the packing of this invention, however, is to build up a saturated solution of nickelate (or other metal ion) adjacent and surrounding the cathode. This build-up inhibits or prevents further dissolution of the cathode into the electrolyte. So long as there is a saturated solution of nickelate in the vicinity of the oxygen electrode, no further dissolution of the electrode in the electrolyte can take place, because the electrolyte in that vicinity has no further solubility for the nickel of the electrode. The build-up and maintenance of this saturated solution of nickel ions, or nickelate, adjacent the cathode is one of the primary functions of the ceria or thoria packing of this invention.

It will be understood that the packing of this invention may be ceria or thoria, or mixtures of the two.

Undesirable migration of the nickel in solution from the vicinity of the cathode toward the anode is promoted by temperature gradients, vibration, gravity, and mechanical agitation. The provision of the packing of this invention in the space between the cathode (or oxidant electrode) and the anode (or fuel electrode) reduces the effect of such forces, and in this manner further inhibits undesirable migration of metal ions and resultant dendrite growth.

These achievements of the packing of this invention result in longer cell life. This longer cell life is produced first, because the theoretical life of the fuel cell is determined by the rate at which the cathode dissolves into the electrolyte, and this rate of dissolution is greatly reduced by the packing of this invention; and second, because the packing of this invention prevents dendrite formation at the anode which can, if allowed to continue for a sufficient period, bridge from the anode to the cathode resulting in a short-circuit that destroys the cell.

The packing material of this invention must maintain its particulate integrity under the severe conditions of temperature and causticity that exist in the intermediate temperature fuel cells of this invention. Conventional packing materials used in low-temperature compact type fuel cells, i.e., alumina ($Al_2O_3$), magnesia (MgO), silica ($SiO_2$), asbestos, and the like all deteriorate at the appreciably higher temperatures and the much more active and caustic electrolyte solutions used in the cells of this invention.

It has been found that particulate packings of ceria and thoria only are satisfactory for the purposes of this invention. Only these materials supply the individual, stable, nonconductive particles necessary to attain the desired reduction of dissolution of the cathode (and resultant migration and dendrite formation at the anode) in the intermediate temperature fuel cells of this invention. Substantial and unexpected beneficial reductions in cathode dissolution and dendrite formation have been found to result from the use of packings of the refractory oxides of cerium and thorium.

Both ceria and thoria have extremely high melting temperatures and both are very stable compounds. And most important, ceria and thoria are both stable in the highly caustic electrolytes used in the intermediate temperature fuel cells of this invention.

The packing of this invention comprises particulate ceria or thoria particles. The individual particles are between about 5 and 100 microns in size, and are preferably at least 20 microns. Particle sizes of about 20 to 50 microns have been found to be particularly effective. The particles should not be so small that they obstruct passages in the pores of the nickel electrode through which gases must pass to form the liquid-gas interface at which the fuel cell reactions take place.

The ceria and thoria particles are packed into the space between the fuel cell electrodes as tightly as possible, so as to substantially fill this space. Normally a cell is packed with ceria or thoria through holes in the top of the cell, and X-ray photographs are taken to determine when the cell is full. This tight packing of the cell serves a secondary function in resisting movement, or buckling, of the electrodes toward each other during operation of the cell.

The use of the packing of this invention produces slight increases in internal resistance losses (IR losses) in the cell, because the presence of the packing decreases the conductivity of the electrolyte. It has been found, however, that the good insulating properties of the particulate ceria and thoria packing of this invention make it possible to reduce the spacing between the electrodes of the cell, thereby reducing the length of the effective internal resistance path and compensating for most of the IR loss resulting from the use of the packing.

In operation, and as best shown by reference to the drawing, pure oxygen, air, or another suitable oxygen-containing gas mixture is fed to oxidant chamber 12 through oxidant inlet 14, and pure hydrogen or some other suitable fuel is fed to fuel chamber 22 through fuel inlet 24. The oxidizing gas diffuses through large-pore section 18a of oxidant electrode 18 and comes into contact with the electrolyte (such as 70 to 85 percent aqueous KOH) at oxidant electrode interface 19. The electrolyte reaches this interface by flowing through small-pore section 18b of oxidant electrode 18.

In space 30 between the oxidant and fuel electrodes, the concentrated caustic electrolyte is dispersed throughout the ceria or thoria packing so that a "trapped" electrolyte effect is achieved.

The electrolyte also flows through fine-pore section 20b of fuel electrode 20, and contacts the fuel gas (i.e., hydrogen or the like), which has diffused through large-pore section 20a of fuel electrode 20, at fuel-electrode interface 21. The electrolyte thereby establishes conducting paths between the reactions occurring at interface 19 of oxidant electrode 18 and interface 21 of fuel electrode 20, and transports the hydroxyl ions formed at the cathode interface 19 to the anode interface 21, where these hydroxyl ions react with hydrogen to form water and the electrical energy output of the cell.

The unreacted oxygen or other oxidant passes out of oxidant chamber 12 through oxidant outlet 16, and the excess hydrogen or other fuel is correspondingly removed from fuel chamber 22 through fuel outlet 26. Both of these purge or outlet streams contain portions of the water produced in the fuel cell reaction, thereby removing this water from the cell.

EXAMPLES

The improvement achieved by the present invention is clearly illustrated by the following examples. These tests establish that significantly reduced nickel dissolution and dendrite growth can be achieved by using the packing of the present invention between the electrodes of a fuel cell. The cells used in these tests were of the type illustrated in the drawing, and used pure oxygen as the oxidizing gas and pure hydrogen as the fuel. The differential pressure between the gas and electrolyte in these tests was about 8 to 10 p.s.i.g. A resistance load was used on the cells, and the power output was measured with voltmeters and ammeters.

The cells were operated at 455° F., using 85 percent aqueous KOH as the electrolyte. A space of 5/16 of an inch was provided between the electrodes, which were preoxidized with lithium and air. In operation, the electrodes were in a vertical position, and had a diameter of 1⅞ inches and an active area of 8 square centimeters. Only the face of the electrodes was exposed to the electrolyte.

Table 1 compares the average results achieved in tests carried out under the above conditions using both unpacked cells and cells packed with ceria and thoria in accordance with the teachings of this invention. Thirteen (13) runs were made with unpacked cells; and a total of thirty-nine (39) runs were made using packed cells, seventeen (17) using ceria packing and twenty-two (22) using thoria packing.

TABLE 1

| Type cell | Average cell voltage, volts | Average current density, ma./cm.$^2$ | Average operating time, hours | Average Ni-dissolution rate mg./cm.$^2$/hr. |
| --- | --- | --- | --- | --- |
| Unpacked | 0.90 | 150 | 200 | 0.06 |
| Packed (with ceria or thoria) | 0.87 | 140 | 200 | 0.01 |

The rate of nickel dissolution at the cathode of fuel cells packed in accordance with this invention was decreased by a factor of six (6). This significant and substantial reduction in the rate of nickel dissolution clearly establishes the effectiveness and desirability of the use of packing of this invention in intermediate temperature fuel cells.

In accordance with the invention, a new and improved intermediate temperature fuel cell is provided which achieves a significantly lower nickel dissolution at the cathode and dendrite growth on the anode during cell operation in highly caustic electrolytes at temperatures of about 350 to 500° F. This improved fuel cell performance is achieved by the use of the ceria and thoria packing between the electrodes of the cell in accordance with the present invention.

The invention in its broader aspects is not limited to the specific details shown and described, but departures may be made from such details within the scope of the accompanying claims without departing from the principles of the invention and without sacrificing its chief advantages.

What is claimed is:
1. A fuel cell comprising:
   (a) a housing;
   (b) a fuel electrode;
   (c) means for supplying fuel to the fuel electrode;
   (d) a metal-containing oxidant electrode spaced from the fuel electrode;
   (e) means for supplying oxidizing gas to the oxidant electrode;
   (f) an electrolyte dispersed between said electrodes; and
   (g) a packing space between said electrodes, which comprises a sufficient quantity of particulate ceria or thoria to inhibit dissolution of the oxidant electrode into said electrolyte during operation of the cell and retard migration of dissolved oxidant electrode metal to the fuel electrode.

2. A fuel cell designed to operate at temperatures of about 350 to 500° F. by the reaction of hydrogen and oxygen, comprising:
   (a) a housing;
   (b) a fuel electrode;
   (c) means for supplying hydrogen to said fuel electrode;
   (d) a metal-containing oxidant electrode spaced from the fuel electrode;
   (e) means for supplying oxygen or air to said oxidant electrode;
   (f) an alkali metal hydroxide electrolyte dispersed between said electrodes which establishes conducting paths between said electrodes; and
   (g) a packing of particulate ceria or thoria in the space between said electrodes, which comprises a sufficient quantity of particulate ceria or thoria to inhibit dissolution of the oxidant electrode into the electrolyte during operation of the cell and retard migration of dissolved oxidant electrode metal to the fuel electrode.

3. The fuel cell of claim 2 in which the packing is ceria.
4. The fuel cell of claim 2 in which the packing is thoria.
5. The fuel cell of claim 2 in which the packing has a particle size of 5 to 100 microns.
6. The fuel cell of claim 5 in which the packing has a particle size of about 20 to 50 microns.
7. The fuel cell of claim 2 in which the electrolyte is KOH.
8. The fuel cell of claim 7 in which the electrolyte is a concentrated aqueous solution of KOH containing at least 60% KOH.
9. The fuel cell of claim 8 in which the packing is ceria.
10. The fuel cell of claim 8 in which the packing is thoria.
11. The fuel cell of claim 2 in which both electrodes are biporous nickel electrodes.
12. The fuel cell of claim 2 in which said packing substantially completely fills the space between said electrodes.

References Cited

UNITED STATES PATENTS

| 3,244,564 | 4/1966 | Fox | 136—86 |
| 3,351,491 | 11/1967 | Harris et al. | 136—86 |

FOREIGN PATENTS

| 636,309 | 2/1962 | Canada. |
| 806,592 | 12/1958 | Great Britain. |

ALLEN B. CURTIS, Primary Examiner

U.S. Cl. X.R.

136—153

PO-1050
(5/69)

UNITED STATES PATENT OFFICE
CERTIFICATE OF CORRECTION

Patent No. 3,470,028  Dated September 30, 1969

Inventor(s) John H. Sizer, Jr. and Jose Giner

It is certified that error appears in the above-identified patent and that said Letters Patent are hereby corrected as shown below:

Claim 1, column 8, line 3, after "packing" insert
-- in the --.

SIGNED AND
SEALED
DEC 23 1969

(SEAL)
Attest:

Edward M. Fletcher, Jr.
Attesting Officer

WILLIAM E. SCHUYLER, JR.
Commissioner of Patents